United States Patent
Schwenk (10) Patent No.: US 11,885,418 B2
(45) Date of Patent: Jan. 30, 2024

(54) MECHANICAL SEAL AND ROTARY UNION HAVING A MECHANICAL SEAL

(71) Applicant: CHRISTIAN MAIER GMBH & CO. KG, Heidenheim (DE)

(72) Inventor: Gunther Schwenk, Heidenheim (DE)

(73) Assignee: CHRISTIAN MAIER GMBH & CO. KG, MASCHINENFABRIK, Heidenheim (DE)

( * ) Notice: Subject to any disclaimer, the term of this patent is extended or adjusted under 35 U.S.C. 154(b) by 0 days.

(21) Appl. No.: 17/276,804

(22) PCT Filed: Sep. 9, 2019

(86) PCT No.: PCT/EP2019/073932
§ 371 (c)(1),
(2) Date: Mar. 16, 2021

(87) PCT Pub. No.: WO2020/058013
PCT Pub. Date: Mar. 26, 2020

(65) Prior Publication Data
US 2021/0388904 A1 Dec. 16, 2021

(30) Foreign Application Priority Data
Sep. 17, 2018 (DE) .......................... 102018215736.7

(51) Int. Cl.
*F16J 15/34* (2006.01)
(52) U.S. Cl.
CPC .......... *F16J 15/344* (2013.01); *F16J 15/348* (2013.01); *F16J 15/3492* (2013.01)
(58) Field of Classification Search
CPC . F16L 27/0804; F16L 27/082; F16L 27/0828; F16J 15/34; F16J 15/344;
(Continued)

(56) References Cited

U.S. PATENT DOCUMENTS 3,002,769 A * 10/1961 Deubler ................ F16L 27/093
285/190
3,652,183 A * 3/1972 Pottharst, Jr. .......... F16J 15/348
415/111
(Continued)

FOREIGN PATENT DOCUMENTS

CN 103791095 B 5/2016
DE 1902396 8/1970
(Continued)

OTHER PUBLICATIONS

International Preliminary Report on Patentability received for PCT Patent Application No. PCT/EP2019/073932, dated Sep. 25, 2020, 19 pages. (5 pages of English Translation and 14 pages of Original Document).
(Continued)

*Primary Examiner* — Nicholas L Foster
(74) *Attorney, Agent, or Firm* — Faegre Drinker Biddle & Reath LLP (57) ABSTRACT

The disclosure relates to a mechanical seal for sealing at least one fluid-carrying channel and/or space extending in a stationary component and/or a rotating component from the environment,
having a seal ring which is supported in a sealing manner in the axial direction against a mating ring and, to compensate for wear on its end sealing surface or on a mating face, is supported against the mating ring elastically and movably in the axial direction with this sealing surface;
having a housing which movably accommodates the mechanical seal ring in the axial direction and encloses the mechanical seal ring with a circumferential part in the circumferential direction. The mechanical seal according to the disclosure, characterized in that the housing has a flange which adjoins the circumferential part in the axial direction and which is integrally formed with the circum-
(Continued)

US 11,885,418 B2

Page 2 ferential part or is connected to the circumferential part by a material bond, wherein the flange forms at least one radially inwardly facing projection and the mechanical seal ring has a stop face opposite the radially inwardly facing projection in the axial direction, with which the mechanical seal ring strikes against the projection during a maximum permissible movement in the axial direction, and the flange forms at least one radially outwardly facing projection with which it can be connected or is connected non-rotatably to one of the two components holding the housing.

20 Claims, 7 Drawing Sheets (58) Field of Classification Search
CPC .... F16J 15/348; F16J 15/3452; F16J 15/3464; F16J 15/3492
See application file for complete search history.

(56) References Cited

U.S. PATENT DOCUMENTS

| | | | | |
|---|---|---|---|---|
| 4,447,063 A * | 5/1984 | Kotzur | ............. | F16J 15/346 |
| | | | | 277/411 |
| 4,497,493 A * | 2/1985 | Sall | ............. | G01B 7/14 |
| | | | | 277/306 |
| 4,586,719 A * | 5/1986 | Marsi | ............. | F04D 29/126 |
| | | | | 277/398 |
| 4,632,431 A * | 12/1986 | McCracken | ......... | F16J 15/3472 |
| | | | | 285/190 |
| 4,934,254 A * | 6/1990 | Clark | ............. | F16J 15/3496 |
| | | | | 427/253 |
| 5,345,829 A | 9/1994 | Yamauchi et al. | | |
| 5,448,924 A * | 9/1995 | Nagai | ............. | F16J 15/3492 |
| | | | | 277/358 |
| 5,813,674 A * | 9/1998 | Dickie | ............. | F16J 15/3476 |
| | | | | 277/390 |
| 6,142,729 A | 11/2000 | Tran et al. | | |
| 6,164,316 A * | 12/2000 | Betti | ............. | F16C 19/362 |
| | | | | 137/340 |
| 6,325,380 B1 * | 12/2001 | Feigl | ............. | F16J 15/3404 |
| | | | | 277/400 |
| 6,425,583 B1 * | 7/2002 | Muraki | ............. | F16J 15/348 |
| | | | | 277/358 |
| 7,997,802 B2 * | 8/2011 | Simon | ............. | F01D 3/04 |
| | | | | 384/121 |
| 8,608,175 B2 * | 12/2013 | Miller | ............. | F02C 7/28 |
| | | | | 277/375 |
| 10,184,565 B2 * | 1/2019 | Leal | ............. | F16J 15/3492 |
| 10,274,087 B2 * | 4/2019 | Young | ............. | F01D 25/183 |
| 10,619,500 B2 * | 4/2020 | Maret | ............. | F01D 11/003 |
| 11,231,396 B2 * | 1/2022 | Goldswain | ............. | G01M 13/005 |
| 11,280,761 B2 * | 3/2022 | Goldswain | ............. | F16J 15/40 |
| 2004/0228553 A1 * | 11/2004 | Simon | ............. | F16C 17/04 |
| | | | | 384/123 |
| 2007/0096399 A1 * | 5/2007 | Miller | ............. | F16J 15/3464 |
| | | | | 277/377 |
| 2008/0181546 A1 * | 7/2008 | Simon | ............. | F16C 25/04 |
| | | | | 384/123 |
| 2018/0209545 A1 * | 7/2018 | Leal | ............. | F16J 15/3284 |
| 2020/0109784 A1 * | 4/2020 | Goldswain | ............. | G01P 3/488 |
| 2020/0110109 A1 * | 4/2020 | Goldswain | ............. | G01M 13/005 |
| 2020/0284350 A1 * | 9/2020 | Schwenk | ............. | F16L 27/0816 |
| 2021/0325347 A1 * | 10/2021 | Goldswain | ............. | G01P 13/045 |

FOREIGN PATENT DOCUMENTS

| | | |
|---|---|---|
| DE | 3301947 A1 | 9/1983 |
| DE | 102017218689.5 A1 | 4/2019 |
| EP | 0989343 A1 | 3/2000 |
| EP | 1479929 A2 | 11/2004 |
| EP | 2362122 A2 | 8/2011 |
| GB | 658249 | 8/1947 |
| JP | H04296260 | 10/1992 |
| JP | H04327069 | 11/1992 |
| JP | 11294596 | 10/1999 |
| JP | 11351407 | 12/1999 |
| JP | 2000186774 | 7/2000 |
| JP | 2002195420 | 7/2002 |
| JP | 2009127738 | 6/2009 |

OTHER PUBLICATIONS

International Search Search Report and Written Opinion, PCT/EP2019/073932, dated Nov. 8, 2019, 14 pages.
IPRP, ISA/EP, PCT/EP2019/073932, dated Sep. 25, 2020, 15 pages.

* cited by examiner

MECHANICAL SEAL AND ROTARY UNION HAVING A MECHANICAL SEAL

CROSS-REFERENCE TO RELATED APPLICATIONS

The present application is a 371 U.S. National Phase Patent Application based on International Application No. PCT/EP2019/073932, filed Sep. 9, 2019, which claims the benefit of German Patent Application No. DE102018215736.7, filed Sep. 17, 2018, the entire disclosures of which are hereby expressly incorporated herein by reference.

BACKGROUND/SUMMARY

The present disclosure relates to a mechanical seal for sealing at least one fluid-carrying channel and/or space extending in a stationary component and/or a rotating component from the environment according to the preamble of claim 1, as well as a rotary union having such a mechanical seal.

DE 33 01 947 A1 discloses a generic mechanical seal for sealing a pump shaft with a housing which accommodates the mechanical seal ring movably in the axial direction and encloses the mechanical seal ring with a cylindrical circumferential component which is inserted into a recess in this pump housing adjacent to an inner wall of the pump housing. The housing of the mechanical seal has an anti-rotation device for the mechanical seal and a base on which a spring element pressing the mechanical seal out of the housing is supported. On the open side of the housing a ring-shaped cover is provided, which is placed on the end face of the housing and sealed against it. The cover is formed in a stepped manner, having a flange that forms a stop to hold the housing in the recess in the pump housing. The cover also holds the mechanical seal ring in the housing without impeding the axial movement of the mechanical seal ring.

The German patent application 10 2017 218 689.5 discloses a mechanical seal having a cylindrical housing that surrounds the mechanical seal ring in the circumferential direction and has a radially inwardly protruding flange on its open side that faces a stop face of the mechanical seal ring in the axial direction so that the mechanical seal ring abuts the flange during a maximum permissible movement in the axial direction. In addition, an encoder in the form of a magnet is provided, which is also supported on or abuts the stop face and, together with a stationary sensor connected to the outside of the housing, forms a position sensor with which the axial position of the mechanical seal ring can be detected, so that the wear of the mechanical seal can be determined.

A disadvantage of the mechanical seals mentioned above is that the housing of the mechanical seal can twist in the stationary component, which accommodates the housing in a tight wrap over the outer circumference. If a position sensor is provided, this can cause the stationary sensor to shear off the housing.

The present disclosure is based on the object of specifying a mechanical seal, in particular having a position sensor, in which unintentional rotation of the mechanical seal housing is prevented. The solution according to the disclosure shall be characterized in particular by a compact and cost-effective design that can be easily integrated.

The object according to the disclosure is solved by a mechanical seal having the features of claim 1. In the dependent claims, particularly advantageous and practical designs of the disclosure as well as a rotary union having a mechanical seal according to the disclosure are specified.

A mechanical seal according to the disclosure for sealing at least one fluid-carrying channel and/or space extending in a stationary component and/or a rotating component from the environment comprises a mechanical seal ring which is supported in a sealing manner in the axial direction against a mating ring. In one embodiment of the disclosure, the at least one fluid-carrying channel extends from a stationary component into a rotating component or from a rotating component into the stationary component, thus through a rotary union. The rotary union serves to transfer the fluid from the respective channel section of the stationary component to the respective channel section of the rotating component, i.e. rotating around an axis of rotation, or vice versa. However, the disclosure can also be applied independently of a rotary union in any component where sealing by a mechanical seal is used. In this respect, the fluid-carrying channel is any space in a stationary component and/or in a rotating component which is sealed against an environment by the mechanical seal. The environment may be another space in the component and/or in another component, or an environment that is no longer enclosed by housing parts. The environment may be unpressurized or pressurized. The fluid may flow in the channel and/or chamber or be stationary. The sealing of at least one fluid-carrying channel and/or room in a pump, such as a liquid pump or gas pump, a compressor and other working machines, is only provided as an example.

As the mechanical seal ring is supported against the mating ring in the axial direction, i.e. in the direction of the axis of rotation of the rotating component, it is subject to wear. For example, the mechanical seal ring is made of or contains carbon. In order to prevent the wear that shortens the mechanical seal ring in the axial direction from causing a leakage, for example in the rotary union, the mechanical seal ring is movable in the axial direction and, to compensate for the wear, is elastically supported with its front sealing surface against the mating ring. Progressive wear is thus compensated for by increasing axial displacement of the mechanical seal ring in the direction of the mating ring. In addition or alternatively, the mating ring can also be subject to abrasion or wear in the area of a mating face in contact with the sealing surface of the mechanical seal ring, so that to compensate for this, the mechanical seal ring is axially displaced by its elastic pretension.

In order to be able to evaluate the extent of the wear or the axial movement of the mechanical seal ring which has already taken place, a position sensor for detecting the position of the mechanical seal ring in the axial direction is provided in accordance with an advantageous embodiment of the disclosure.

The mechanical seal according to the disclosure has a housing which accommodates the mechanical seal ring and in which the mechanical seal ring is movable in the axial direction. The housing has a circumferential part which encloses the mechanical seal ring in the circumferential direction. This circumferential part can, for example, be enclosed by a stationary part of a machine in which the mechanical seal seals the channel and/or space.

According to the disclosure, the housing has a flange which is connected to the circumferential part in the axial direction and which is designed in one piece with the circumferential part or which is connected to the circumferential part with a material bond. The flange forms at least one radially inwardly facing projection and the mechanical seal ring has a stop surface opposite the radially inwardly directed projection in the axial direction, with which the mechanical seal ring abuts against the projection during a maximum permissible movement in the axial direction, and the flange further forms at least one radially outwardly facing projection, with which it can be connected or is connected non-rotatably to one of the two components accommodating the housing.

According to the disclosure, the flange thus serves not only to secure the mechanical seal ring against slipping out of the housing, but also to prevent the housing from rotating in the component enclosing the housing. If a position sensor is also provided, the flange can also serve to connect the stationary sensor, which works together with an encoder of the position sensor connected to the mechanical seal ring. In particular, the flange alone carries the stationary sensor, either directly or via a component carried by the flange, for example a bracket.

According to one embodiment of the disclosure, the flange is formed annularly and in particular in a flat manner and protrudes radially inwards and radially outwards beyond the circumferential part. This means that the circumferential part adjoins the flange at a distance from the radially inner edge and the radially outer edge.

Preferably, the mechanical seal ring is held in the housing so that it cannot twist, for example by means of an undercut. For example, an axial groove can be provided in the mechanical seal ring and/or housing, in which a corresponding counterpart projection of the other component—housing or mechanical seal ring—engages positively.

According to one embodiment of the disclosure, the anti-rotation device of the flange on one of the two components—the stationary component or the rotating component—can be achieved positively, i.e. by forming at least one undercut. For example, the flange has radial recesses and/or radial projections positioned one behind the other in its circumferential direction and distributed over the circumference, which overlap or engage with corresponding counterpart projections and/or recesses in the component.

According to an advantageous embodiment of the disclosure, the flange has through-holes arranged in a distributed manner over the circumference and positioned one behind the other in the circumferential direction for non-rotatably connecting the flange to the component. For example, screws or pins can be inserted into the component through the through-holes or the flange can be pushed over corresponding pins or other projections on the component to achieve a positive fit in the circumferential direction.

For example, the housing is made of sheet metal, wherein the flange is welded especially on the circumferential part. No welding seam is necessary along the entire circumference, but individual sections or points of the welding can be provided. The flange can thus be produced as a flat sheet metal ring, for example by punching, and then connected to the cylindrical or cup-shaped circumferential part.

According to one embodiment of the disclosure, in addition to the through-holes for non-rotational connection of the flange, further centering holes are provided in the flange, distributed over the circumference and arranged one behind the other. These can be used to center the flange relative to the circumferential part when the flange is mounted on the circumferential part. Furthermore, such centering holes can be used to center the housing in the component accommodating the housing, if necessary. Of course, it is also possible to use the through-holes for non-rotational connection of the flange to the component as centering holes when mounting the flange to the circumferential part, so that additional centering holes can be omitted if necessary.

According to an embodiment in accordance with the disclosure, a bearing housing is provided which accommodates bearings—roller bearings or plain bearings—for supporting the rotating component. The flange can then be connected non-rotatably to the bearing housing, in particular it can be connected directly to the bearing housing, for example by means of the radial projections and/or radial recesses shown and/or with the through-holes distributed around the circumference, through which corresponding mounting elements such as screws or pins are introduced.

According to one embodiment of the disclosure, the housing of the mechanical seal ring may form the stationary component or the rotating component which defines the fluid-carrying channel and/or space. For example, in such a case the circumferential part may have a connection for the supply or discharge of the fluid, for example a connecting thread for a fluid hose.

In the embodiment shown with position sensor for detecting the position of the mechanical seal ring in the axial direction, at least one encoder is attached to the mechanical seal ring, which moves with the mechanical seal ring in the axial direction. For example, the encoder is inserted into a radial bore of the mechanical seal ring and can preferably be flush with the mechanical seal ring radially on the outside. Furthermore, a stationary sensor positioned radially outside the circumferential part is provided, which detects the position of the encoder in the axial direction, wherein the stationary sensor is supported by the circumferential part and/or the flange.

According to a preferred embodiment, the circumferential part has a breakthrough in the peripheral area where the stationary sensor faces, in order to improve the signal transmission between the encoder and the stationary sensor.

According to a particularly preferable embodiment, the flange has a bracket extending in the axial direction and in the circumferential direction or obliquely outwards or in the tangential direction, which is positioned at a distance from the circumferential part and supports the stationary sensor. For example, the bracket is designed as a sheet metal strip welded to the flange, especially a flat sheet metal strip. The stationary sensor can, for example, be glued to the sheet metal strip. According to one embodiment, the bracket carries the stationary sensor on its surface facing the circumferential part.

In particular, the flange has a longitudinal groove which penetrates it, extending for example in tangential direction, circumferential direction or diagonally outwards. The longitudinal groove is preferably straight. This longitudinal groove can accommodate at least one connecting cable of the stationary sensor. Thus, the at least one connecting cable can be led from the side of the stationary sensor through the flange to the side of the flange facing away from the stationary sensor and from there for example to the outside of the component accommodating the housing, for example through a leakage channel in this component.

The sensor may comprise or be formed by at least one magnet and the stationary sensor may be formed as a Hall sensor which detects the position of the at least one magnet in the axial direction.

Preferably, the housing has a housing base which is opposite to an end face of the mechanical seal ring that faces away from the sealing surface, and the mechanical seal ring is elastically supported on the housing base by means of a spring element, in particular a corrugated spring, between the end face and the housing base.

The mechanical seal ring comprises in particular a hollow cylindrical carbon ring or is formed from such a ring, which has an end face forming the sealing surface and has in particular the end face facing the housing base.

In particular, the mechanical seal ring is stationary and the mating ring extends around relative to the mechanical seal ring.

According to a feature of the present disclosure, which can also be implemented independently of the further features presented here, in particular also in the case of a mechanical seal without the flange on the housing, which forms the projection and enables the anti-rotation device, a speed sensor is associated with the mating ring, which cooperates with an encoder in the mating ring to detect the speed of the mating ring. The speed sensor can, for example, be positioned in the axial direction next to the housing of the mechanical seal and be attached to the stationary component there. However, it is preferable if the housing, as shown above, is designed with a flange connected to a circumferential part in a materially bonded or integral manner and this flange also carries the speed sensor.

Thus, according to one embodiment of the disclosure, the flange can accommodate or support the stationary sensor of the position sensor on its first axial side and accommodate or support the speed sensor on its other axial side. The sensors can each be positioned preferably on a bracket of the type shown, for example on welded-on sheet metal strips which are inserted into the flange. The brackets can be provided offset to each other in the circumferential direction of the flange, especially when inserted into different openings in the flange. However, it is also possible to insert a bracket through an opening in the flange and fix it there in such a way that this bracket carries on one axial side of the flange the stationary sensor of the position sensor for wear detection and on the other axial side the speed sensor for speed detection.

The encoder for the speed sensor can, for example, be designed by at least one flattened portion or notch or other marking on the outer circumference or also on one end face of the mating ring. According to a preferred design, the encoder is formed by at least one magnet and the speed sensor is designed as a Hall sensor.

In the case of a rotary union according to the disclosure having a stationary component and a rotating component and a channel sealed with a mechanical seal according to the disclosure, which extends in the stationary component and the rotating component, the flange is connected non-rotatably to the stationary component or non-rotatably to the rotating component. For example, the flange is connected non-rotatably to the stationary component and the stationary component has an inner wall which surrounds the circumferential part of the housing, in particular adjacent to it, and in which a recess is provided which is limited at least in the peripheral direction and is arranged and dimensioned to accommodate the stationary sensor.

For example, the stationary component may also be provided with the aforementioned leakage channel, in particular in the form of a bore, which discharges fluid passing through the mechanical seal from the component, and the at least one connecting cable of the stationary sensor may be led through the leakage channel, in particular after it has been led through the longitudinal groove starting from the stationary sensor.

The present disclosure is not limited to a rotary union with a mechanical seal. Rather, other components or machines can be designed with a mechanical seal according to the disclosure to seal a channel or chamber. For example, reference is made to a pump with such a mechanical seal.

BRIEF DESCRIPTION OF THE DRAWINGS

The disclosure will be described in the following with the help of an exemplary embodiment and the figures, wherein.

DETAILED DESCRIPTION

Figure 1:
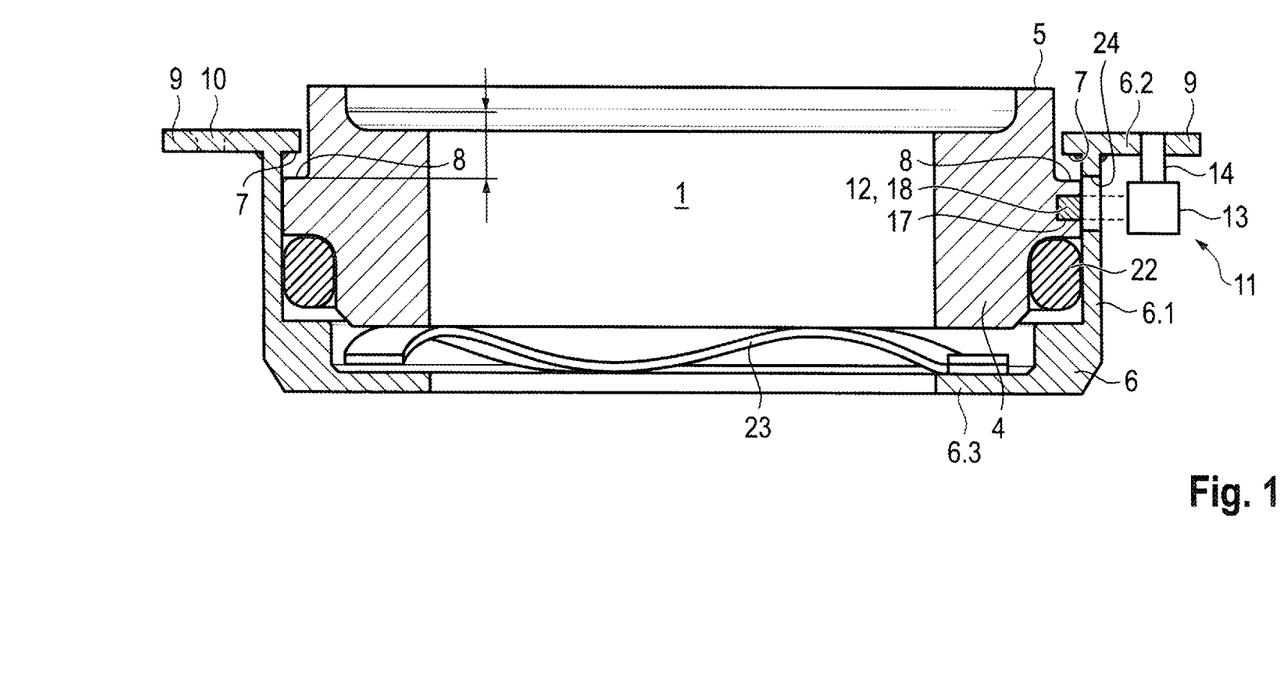
FIG. 1 shows a schematic diagram of a mechanical seal according to the disclosure.

FIG. 1 shows a mechanical seal designed in accordance with the disclosure, comprising a housing 6 with a circumferential part 6.1 and a flange 6.2 connected to the front of said housing in the axial direction at its open end. As indicated, the flange 6.2 is welded, for example, to the circumferential part 6.1.

The circumferential part 6.1 is designed cylindrically and encloses the mechanical seal ring 4 in the peripheral direction. The mechanical seal ring 4 is inserted into the housing 6 by means of a seal 22, in this case sealed against the circumferential part 6.1.

The mechanical seal ring 4 has a sealing surface 5 on its end face protruding from the housing 6. On its end face facing away from the sealing surface 5, the mechanical seal ring 4 is subjected to pressure elasticity by means of a spring element 23, for example in the form of a corrugated spring. The spring element 23 is supported on the housing base 6.3 of the housing 6.

The mechanical seal ring 4 can be pressed out of the housing 6 by the spring element 23 until its stop face 8 facing away from the spring element 23 abuts against a radially inwardly facing projection 7 of the flange 6.2. This compensates for wear on the sealing surface 5 which shortens the mechanical seal ring 4 in the axial direction.

Furthermore, the flange 6.2 has a radially outwardly facing projection 9, which on the one hand serves to non-rotatably connect the housing 6 to a component holding the housing 6 and on the other hand serves to connect the stationary sensor 13 of a position sensor 11. Additionally or alternatively, the stationary sensor 13 could also be connected to the circumferential part 6.1 of the housing 6 as indicated by the dashed line.

The stationary sensor 13 interacts with an encoder 12, which here is placed in the form of a magnet 18 in a radial bore 17 of the mechanical seal ring 4. In the area of the stationary sensor 13 or the encoder 12, an opening 24 is provided in the circumferential part 6.1 in order not to obstruct the signal flow from the encoder 12 to the stationary sensor 13.

The stationary sensor 13 is supported by a bracket 14 connected to the radially outwardly facing projection 9 of the flange 6.2. In particular, the bracket 14 is connected to the flange 6.2 in a materially bonded manner or is designed integrally with the flange 6.2, and the stationary sensor 13 is connected to the bracket 14 with a form fit or material connection.

The mechanical seal ring 4, with its sealing surface 5, together with a mating ring not shown in FIG. 1, seals channel 1, which carries a fluid such as water or gas.

Figure 2:
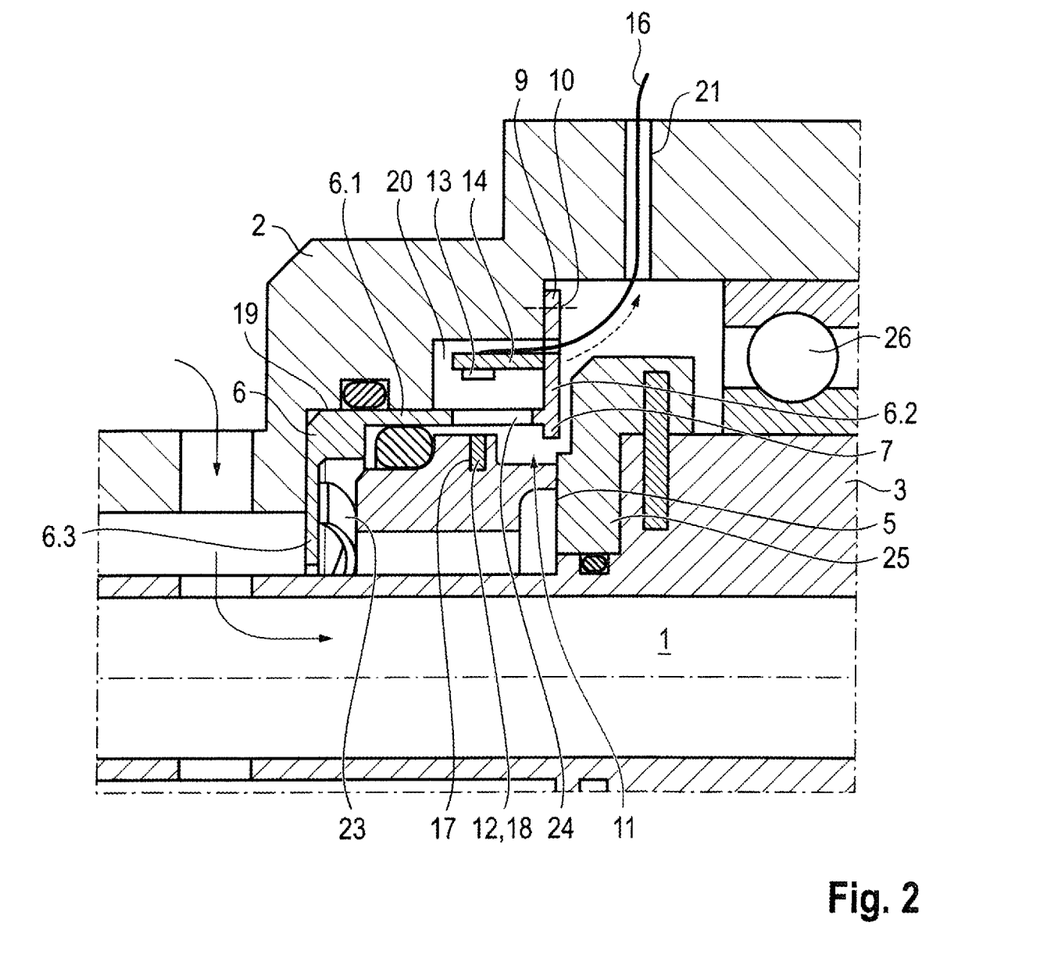
FIG. 2 shows another schematic sectional view of a rotary union having a mechanical seal according to the disclosure.

FIG. 2 shows an example of the use of a mechanical seal according to the disclosure. This corresponds largely to the design as shown in FIG. 1, except that the stationary sensor 13 is connected, and in particular glued, to a radially inwardly facing surface of the bracket 14.

In the rotary union as shown in FIG. 2, the housing 6 is inserted into the stationary component 2 in a torsion-proof manner. For this purpose, the flange 6.2 is screwed or pinned through the through-holes 10 in the stationary component 2.

The housing 6 again comprises the circumferential part 6.1, which rests radially inwardly against an inner wall 19 of the stationary component 2. The stationary component 2 also has a recess 20 that accommodates the bracket 14 together with the stationary sensor 13. In order to form the position sensor 11, the stationary sensor 13 in turn faces the encoder 12, which is designed in the form of a magnet 18 and inserted into a radial bore 17 in the mechanical seal ring 4, via the opening 24. The spring element 23, which presses the sealing surface 5 of the mechanical seal ring 4 against the mating ring 25 and is supported on the housing base 6.3, is also shown, wherein the corresponding reference numerals from FIG. 1 are also used for corresponding components.

The mating ring 25 is part of the rotating component 3, which is supported by at least one bearing 26 in the stationary component 2 and encloses the channel 1. The channel 1 also extends through the stationary component 2 as indicated by the arrows, for example through an inlet or outlet in the stationary component 2.

If a leakage escapes via the sealing surface 5, i.e. between the mechanical seal ring 4 and the mating ring 25, as indicated by the dashed arrow, it is discharged through the leakage channel 21 in the stationary component 2. In the exemplary embodiment shown, such a leakage channel 21 also serves to lead at least one connecting cable 16 of the stationary sensor 13 out of the stationary component 2.

In order to lead the connecting cable 16 through flange 6.2 from the side of the stationary sensor 13 to the side of the leakage channel 21 facing away in axial direction, at least one opening, especially a longitudinal groove, can be provided in flange 6.2 through which the connecting cable 16 is led. A number of such longitudinal grooves 15 can be seen in FIG. 3, which shows a frontal plan view of the so-called open side of the housing 6, i.e. the side of the sealing surface 5. Again, the corresponding reference numerals are used for the corresponding components, which correspond to the reference numerals in FIGS. 1 and 2.

Figure 3:
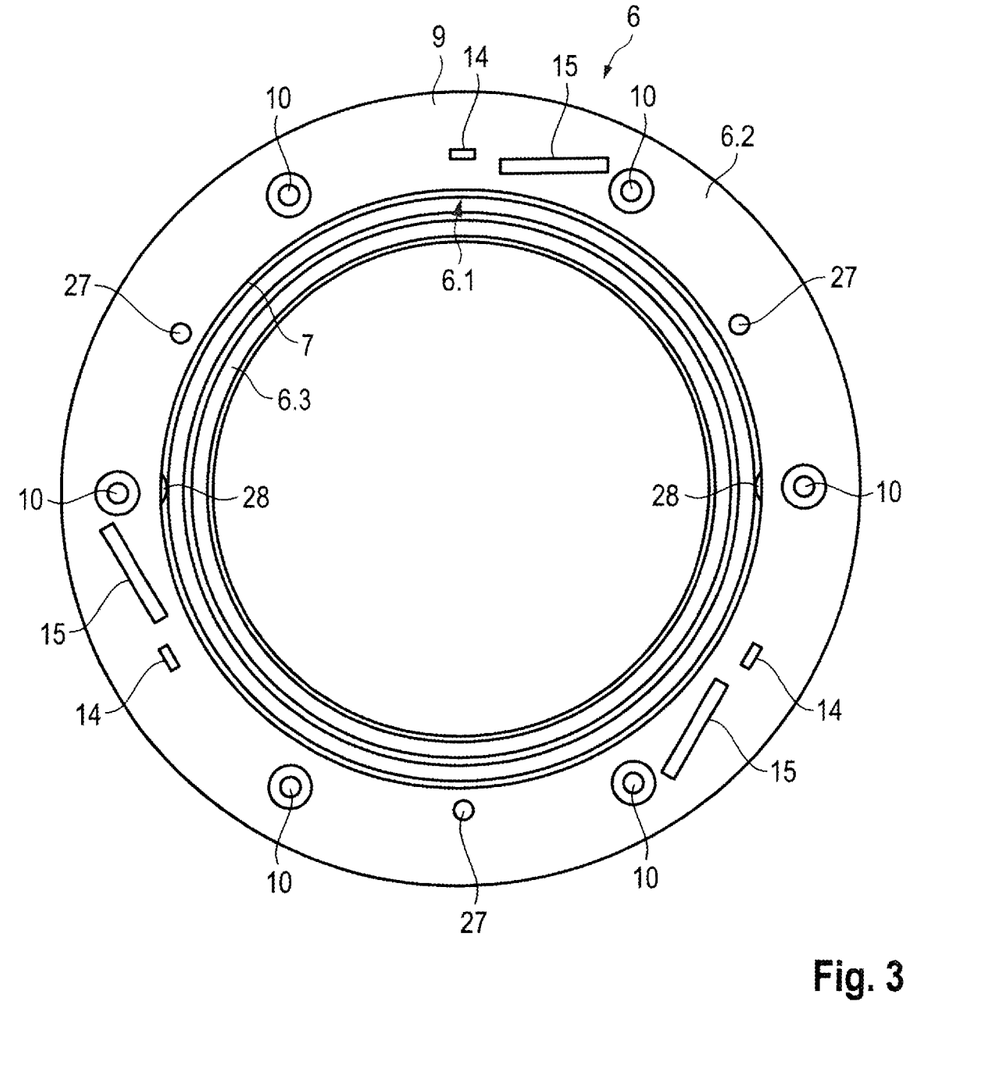
FIG. 3 shows a top view of an exemplary embodiment of a flange of a mechanical seal according to the disclosure.

For example, the housing 6 comprises the circumferential part 6.1, the flange 6.2 and the housing bottom 6.3. The flange 6.2 has the radially inwardly facing projection 7 and the radially outwardly facing projection 9. In the radially outwardly facing projection 9, the through-holes 10 are provided for non-rotating connection of the flange 6.2.

Furthermore, FIG. 3 shows the openings into which the bracket 14 can be inserted to fix it. In addition to these openings, the longitudinal grooves 15 extending in a tangential direction are provided here for the connecting cable of the stationary sensor.

In the exemplary embodiment shown, there are three openings each for the brackets 14 and three longitudinal grooves 15. This enables the selection of a suitable position for the stationary sensor. It is understood that a plurality of stationary sensors could also be used accordingly.

When designed according to FIG. 3, the flange 6.2 or its radially outwardly facing projection 9 has centering holes 27, which serve to center the flange 6.2 on the circumferential part 6.1 before and/or during the flange 6.2 is connected to the circumferential part 6.1 with a material bond. At the same time, these centering holes 27 can also be used to center the housing 6 in the component in which the housing 6 is accommodated.

In the exemplary embodiment shown in FIG. 3, the housing 6 also has radially inwardly facing projections 28 which engage in corresponding recesses in the mechanical seal ring to prevent the mechanical seal ring from rotating circumferentially relative to the housing 6.

Instead of the flange 6.2, which is materially bonded to the circumferential part 6.1, especially by welding, as shown in the exemplary embodiment, the flange 6.2 could also be produced by forming the housing 6 on the circumferential part 6.1. For example, the housing 6 can be bent at its open end first inwards and then outwards or vice versa to form the radially inwardly facing projection 7 and the radially outwardly facing projection 9.

Figure 4:
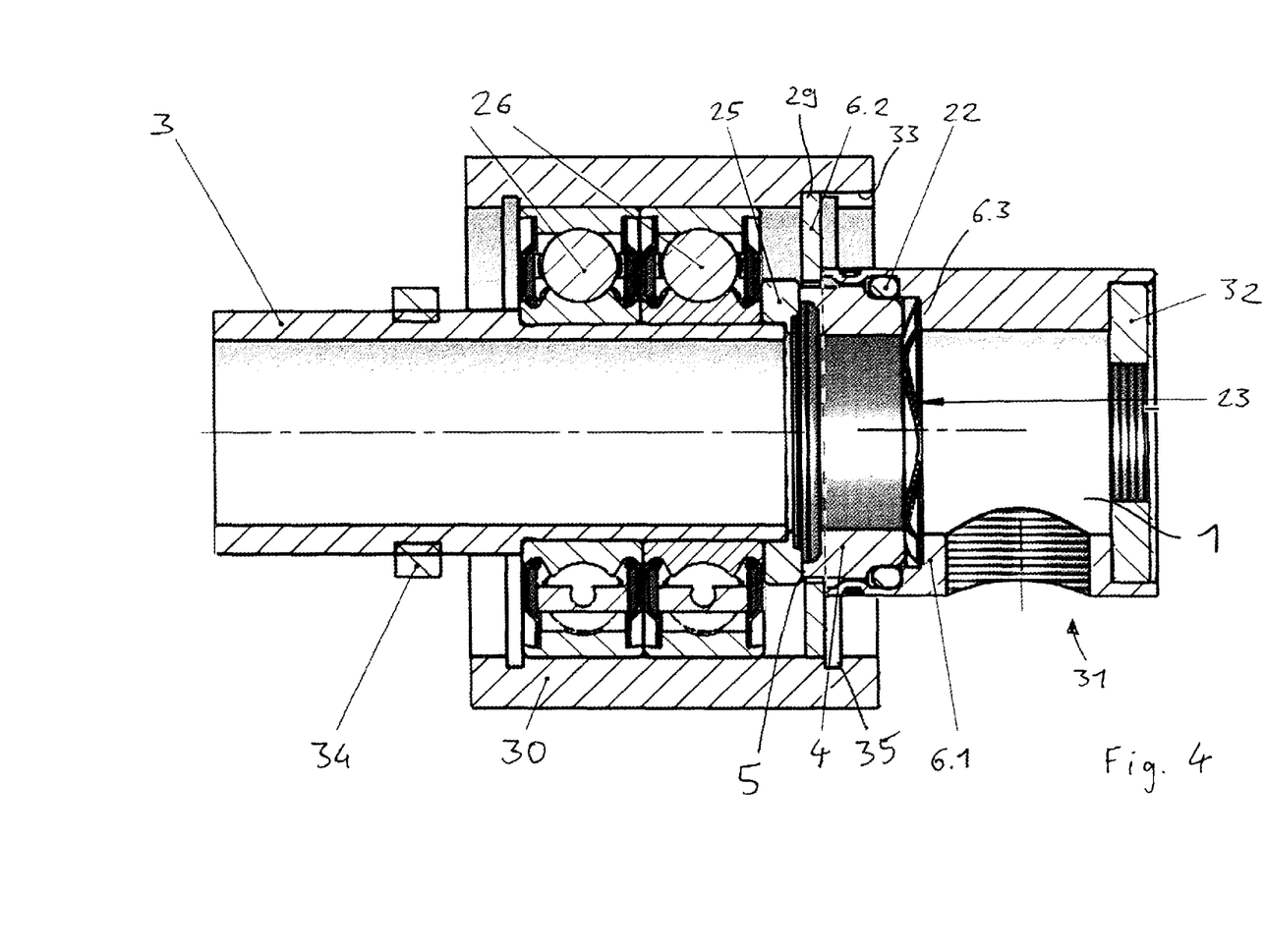
FIG. 4 shows a schematic sectional view of another mechanical seal according to the disclosure.
Figure 5:
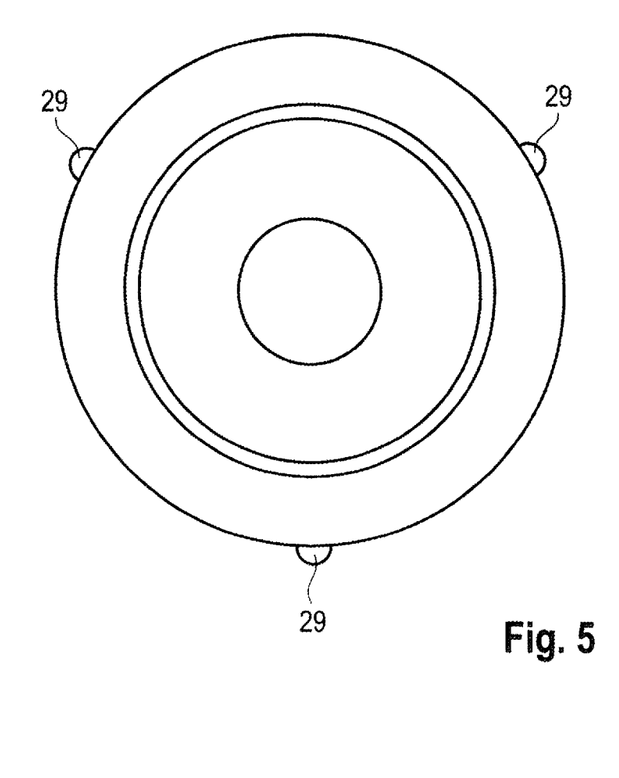
FIG. 5 shows a frontal top view of the flange of the mechanical seal as shown in FIG. 4.
Figure 6:
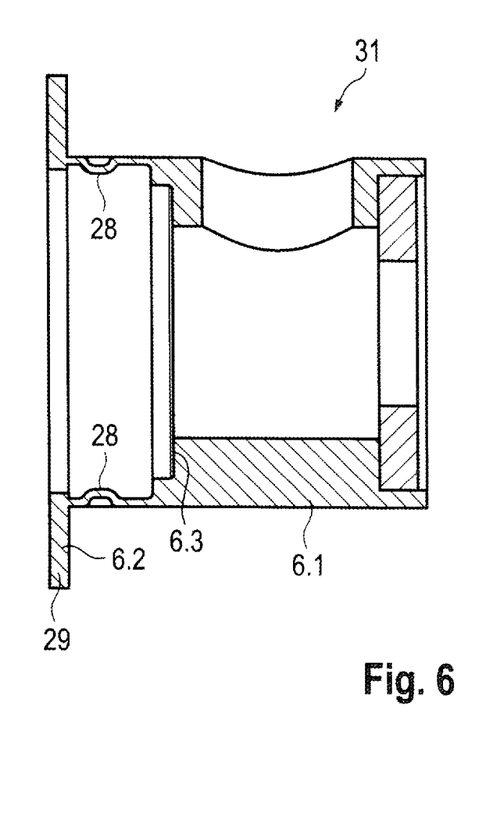
FIG. 6 shows a sectional view through the housing of the mechanical seal from FIG. 4.

In the embodiment shown in FIGS. 4 to 6, the housing 6 of the mechanical seal also forms the stationary component 2 or a part of the stationary component 2, which encloses the channel 1. For example, the circumferential part 6.1 has a connection 31 in the form of an inlet or outlet for the medium passing through channel 1. For example, a connection thread for a fluid hose (or medium hose) can be provided for connection 31.

In the embodiment shown in FIGS. 4 to 6, the circumferential part 6.1 is extended beyond the housing base 6.3 in the direction of the axis of rotation of the mechanical seal in order to be able to insert connection 31, which is aligned particularly in the radial direction. On the end face, channel 1 is closed by cover 32, which can be designed completely closed or, optionally, additionally or alternatively form a connection 31 for the fluid.

As in the previous exemplary embodiment, the spring element 23 is supported on the housing base 6.3 to press the sealing surface 5 of the mechanical seal ring 4 against the mating ring 25.

The mating ring 25 rotates with the rotating component 3, which is mounted in a bearing housing 30 by means of the bearings 26, here roller bearings. The flange 6.2 of the housing 6 of the mechanical seal, which in turn is designed in one piece with the circumferential part 6.1 or is connected to it by material bonding, is non-rotatably connected to the bearing housing 30. In the exemplary embodiment shown, flange 6.2 has radial projections 29 which engage in corresponding axial grooves 33 in the bearing housing 30. The flange 6.2 is secured in the axial direction, for example, by a circlip 35, which may be designed as a snap ring.

In the exemplary embodiment shown, a nut 34 is screwed onto the rotating component 3. However, this is not mandatory.

Although this is not shown in detail, the housing 6 carries the stationary sensor of a position sensor according to a preferred embodiment, as shown in the design according to FIGS. 1 to 3. Accordingly, the flange 6.2 may be designed according to the illustration in FIG. 3, wherein in particular the radial projections 29 are additionally provided and if necessary the through-holes 10 are omitted.

Figure 7:
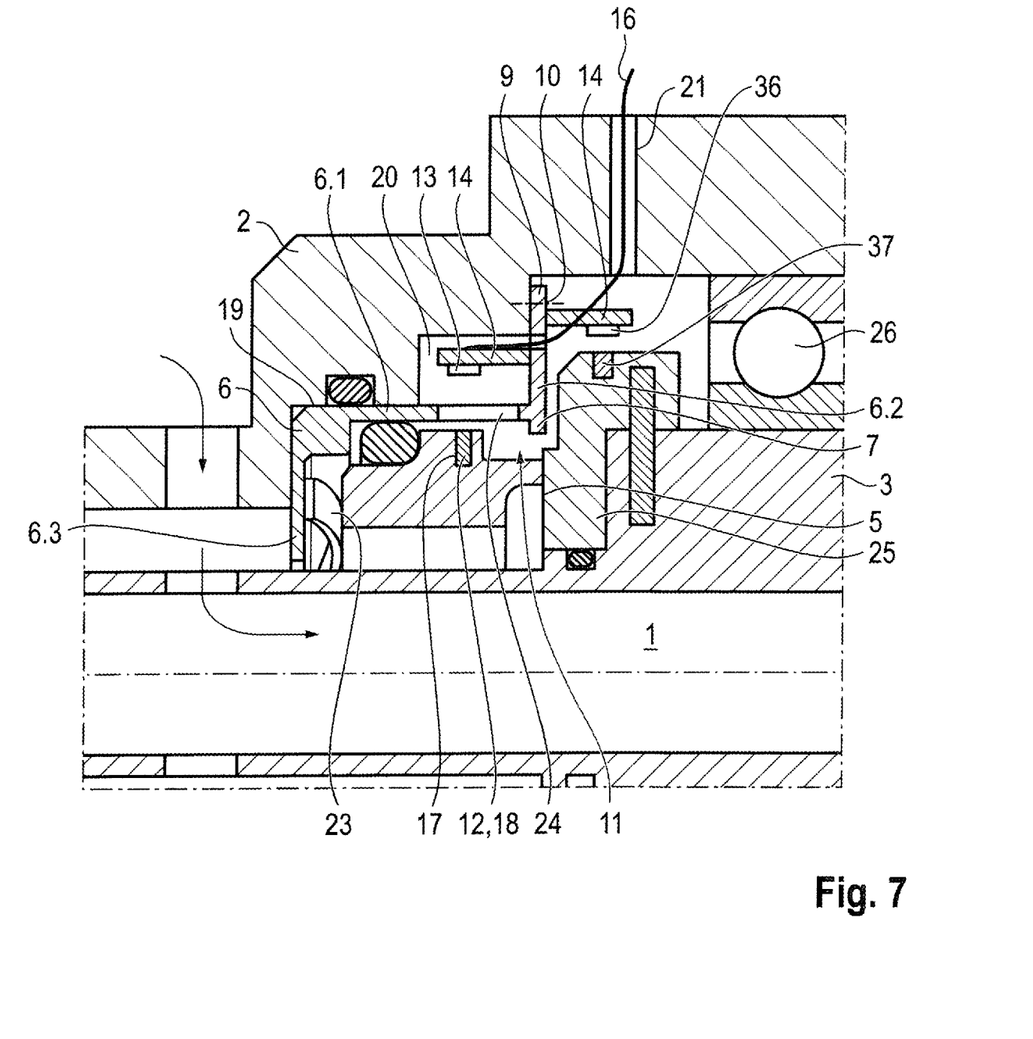
FIG. 7 shows a sectional view analogous to that of FIG. 2 with an additional speed sensor.

When designed according to FIG. 7, the flange 6.2 carries a speed sensor 36 on the side facing away from the stationary sensor 13 by means of a further bracket 14, which cooperates with an encoder 37 in the mating ring 25 to detect the speed of the mating ring 25 and thus of the rotating component 3. The bracket 14 for the speed sensor 36 can, for example, be mounted on flange 6.2 in the same way as the bracket 14 for the stationary sensor 13. Alternatively, it is also possible to have the two brackets 14 for the stationary sensor 13 and the speed sensor 36 designed integrally, e.g. as a sheet metal part pushed through the flange 6.2.

Figure 8:
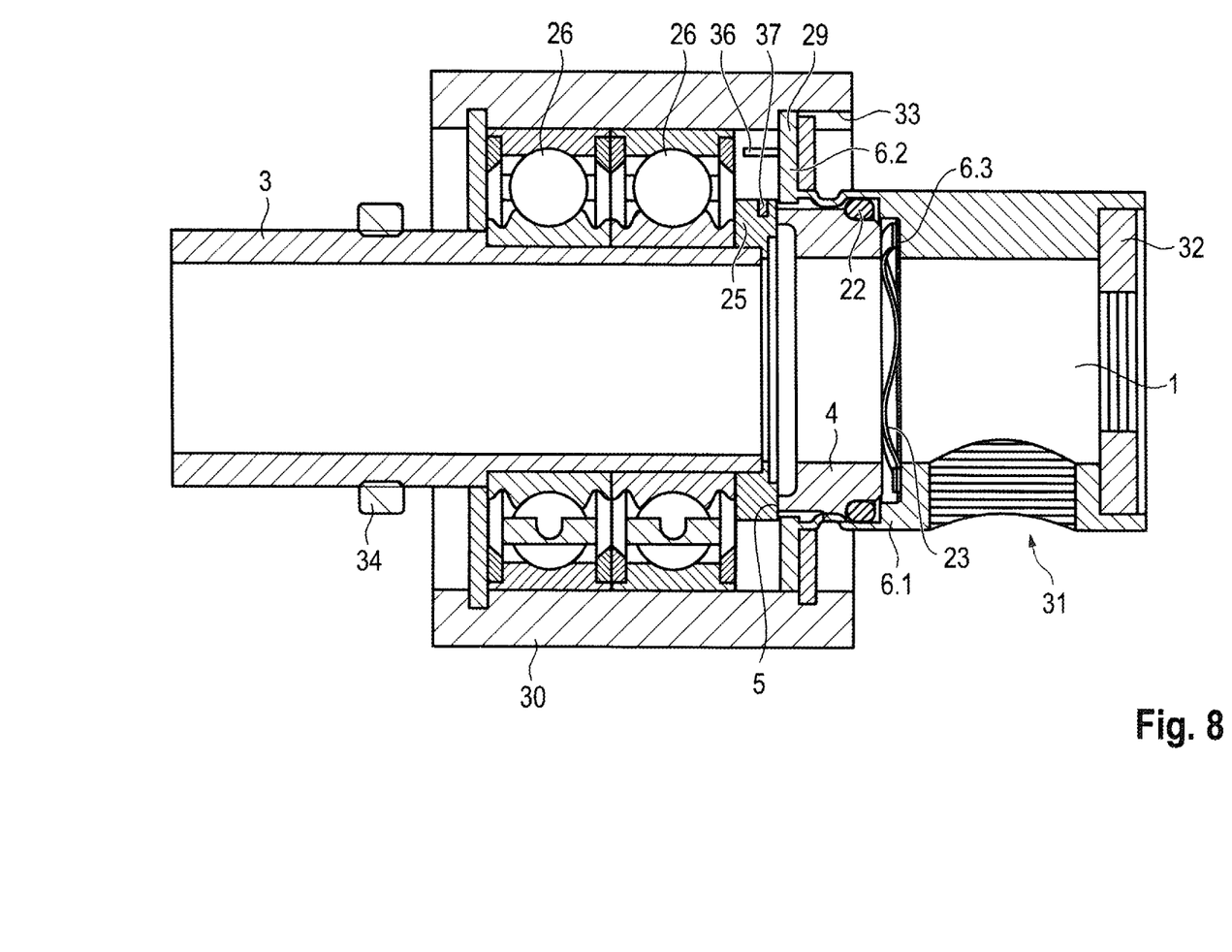
FIG. 8 shows a sectional view analogous to that of FIG. 4 with an additional speed sensor.

FIG. 8 shows a further exemplary embodiment analogous to the one in FIGS. 4 to 6, also additionally equipped with a speed sensor 36, which interacts with an encoder 37 in the mating ring 25 to detect the speed of the mating ring 25 or the rotating component 3.

LIST OF REFERENCE NUMERALS

1 Channel
2 Stationary component
3 Rotating component
4 Mechanical seal ring
5 Sealing surface
6 Housing
6.1 Circumferential part
6.2 Flange
6.3 Housing base
7 Radially inwardly facing projection
8 Stop surface
9 Radially outwardly facing projection
10 Through-hole
11 Position sensor
12 Encoder
13 Stationary sensor
14 Bracket
15 Longitudinal groove
16 Connecting cable
17 Radial Bore
18 Magnet
19 Inner wall
20 Recess
21 Leakage channel
22 Seal
23 Spring element
24 Opening
25 Mating ring
26 Bearing
27 Centering hole
28 Projection
29 Radial projection
30 Bearing housing
31 Connection
32 Cover
33 Axial groove
34 Nut
35 Circlip
36 Speed sensor
37 Encoder

The invention claimed is:

1. A mechanical seal for sealing at least one channel from an environment, the mechanical seal comprising:
a mechanical seal ring supported in a sealing manner in an axial direction against a mating ring and, to compensate for wear on one or both of an end sealing surface of the mechanical seal ring and a mating face of the mating ring, is supported elastically and movably in the axial direction to bear against the mating ring; and
a housing which movably accommodates the mechanical seal ring in the axial direction and encloses the mechanical seal ring with a circumferential part in a peripheral direction;
wherein
the housing has a flange adjoining the circumferential part in the axial direction, the flange is integral with the circumferential part or is connected to the circumferential part in a material-bonded manner, wherein the flange forms at least one radially inwardly facing projection and the mechanical seal ring comprises a stop face which is opposite the radially inwardly facing projection in the axial direction, whereby during normal operation of the mechanical seal the mechanical seal ring will strike against the radially inwardly facing projection during a maximum permissible movement in the axial direction, and
the flange forms at least one radially outwardly facing projection with which the flange can be connected non-rotatably to the component receiving the housing.

2. The mechanical seal according to claim 1, wherein the flange is annular and projects radially inwards as well as radially outwards beyond the circumferential part.

3. The mechanical seal according to claim 2, wherein the mechanical seal ring is held non-rotatably in the housing.

4. The mechanical seal according to claim 2, wherein the radially outwardly facing projection of the flange is one of a plurality of radially outwardly facing projections, the radially outwardly facing projections defining radial recesses between successive ones of the plurality of radially outwardly facing projections, the radially outwardly facing projections and/or radial recesses operable for non-rotatably connecting the flange to the component, the radially outwardly facing projections and radial recesses arranged distributed over a circumference of the flange and being positioned one after the other in a circumferential direction.

5. The mechanical seal according to claim 1, wherein the mechanical seal ring is held non-rotatably in the housing.

6. The mechanical seal according to claim 5, wherein the radially outwardly facing projection of the flange is one of a plurality of radially outwardly facing projections, the radially outwardly facing projections defining radial recesses between successive ones of the plurality of radially outwardly facing projections, the radially outwardly facing projections and/or radial recesses operable for non-rotatably connecting the flange to the component, the radially outwardly facing projections and radial recesses arranged distributed over a circumference of the flange and being positioned one after the other in a circumferential direction.

7. The mechanical seal according to claim 1, wherein the radially outwardly facing projection of the flange is one of a plurality of radially outwardly facing projections, the radially outwardly facing projections defining radial recesses between successive ones of the plurality of radially outwardly facing projections, the radially outwardly facing projections and/or radial recesses operable for non-rotatably connecting the flange to the component, the radially outwardly facing projections and radial recesses arranged distributed over a circumference of the flange and being positioned one after the other in a circumferential direction.

8. The mechanical seal according to claim 1, wherein the flange has through-holes distributed over a circumference of the flange and positioned one after the other in a circumferential direction for non-rotatably connecting the flange to the component.

9. The mechanical seal according to claim 1, wherein the housing is made of sheet metal, and wherein the flange is welded to the circumferential part.

10. The mechanical seal according to claim 1, wherein the flange is configured to non-rotatably connect to a bearing housing which receives bearings for supporting the component, wherein the component comprises a rotating component.

11. The mechanical seal according to claim 1, wherein the mechanical seal has a position sensor for detecting the position of the mechanical seal ring in the axial direction, having an encoder fixed to the mechanical seal ring and moving with the mechanical seal ring in the axial direction, and having a stationary sensor which is positioned radially outside the circumferential part and detects the position of the encoder in the axial direction, wherein the stationary sensor is supported by at least one of the circumferential part and the flange.

12. The mechanical seal according to claim 11, further comprising a bracket extending from the flange, wherein the bracket is positioned at a distance from the circumferential part and operably carries the stationary sensor.

13. The mechanical seal according to claim 11, wherein the flange has at least one groove penetrating it, the groove accommodates at least one connecting cable of the stationary sensor.

14. The mechanical seal according to claim 11, wherein the encoder is inserted into a radial bore of the mechanical seal ring and is flush with the mechanical seal ring radially on the outside.

15. The mechanical seal according to claim 11, wherein the encoder comprises at least one magnet or is formed thereby, and the stationary sensor is designed as a Hall sensor which detects the position of the magnet in the axial direction.

16. The mechanical seal according to claim 1, wherein the housing has a housing base which is opposite an end face of the mechanical seal ring facing away from the sealing surface, and the mechanical seal ring is supported elastically on the housing base by a spring element between the end face and the housing base.

17. The mechanical seal according to claim 1, wherein the flange carries a speed sensor which cooperates with an encoder in at least one of the mechanical seal ring or the mating ring.

18. A rotary union, comprising a stationary component and a rotating component and a channel which is sealed with the mechanical seal according to claim 1, the mechanical seal extends in the stationary component and the rotating component, wherein the flange of the mechanical seal is non-rotatably connected a component of the rotary union.

19. The rotary union according to claim 18, wherein the flange of the mechanical seal ring is non-rotatably connected to the stationary component and the stationary component has an inner wall which surrounds the circumferential part of the housing and in which a recess is arranged and dimensioned to accommodate a stationary sensor.

20. The rotary union according to claim 19, wherein at least one leakage channel is provided in the stationary component, the channel discharges fluid which passes through the mechanical seal ring from the stationary component, and at least one connecting cable of the stationary sensor is guided through the leakage channel, wherein the connecting cable is guided through a groove.

* * * * *